(12) United States Patent
Agarwal et al.

(10) Patent No.: US 12,079,159 B1
(45) Date of Patent: Sep. 3, 2024

(54) HETEROGENEOUS RADIATION-HARDENED COMPUTING SYSTEM

(71) Applicant: National Technology & Engineering Solutions of Sandia, LLC, Albuquerque, NM (US)

(72) Inventors: Sapan Agarwal, Cambridge, MA (US); Christopher Michael, Albuquerque, NM (US); Matthew Marinella, Gilbert, AZ (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 167 days.

(21) Appl. No.: 17/960,291

(22) Filed: Oct. 5, 2022

(51) Int. Cl.
 *G06F 11/16* (2006.01)
 *G06F 15/82* (2006.01)
(52) U.S. Cl.
 CPC .............. *G06F 15/82* (2013.01); *G06F 11/16* (2013.01)
(58) Field of Classification Search
 CPC ................................. G06F 11/16; G06F 15/82
 See application file for complete search history.

(56) References Cited

U.S. PATENT DOCUMENTS

| | | | | |
|---|---|---|---|---|
| 6,063,690 | A | * | 5/2000 | Woodruff .......... H01L 21/76221 257/E21.559 |
| 7,428,473 | B2 | * | 9/2008 | Rodriguez ............ G06F 11/263 713/340 |
| 2011/0078498 | A1 | * | 3/2011 | Flatley ................ G06F 11/1629 714/15 |

OTHER PUBLICATIONS

Clark, et al., "An Embedded Microprocessor Radiation Hardened By Microarchitecture And Circuits", In IEEE Transactions on Computers, vol. 65, No. 2, 2015, pp. 382-395.

* cited by examiner

*Primary Examiner* — Nadeem Iqbal
(74) *Attorney, Agent, or Firm* — Mark A. Dodd (57) ABSTRACT

A radiation-hardened (rad-hard) computing system can include a rad-hard processor, a second processor, and a memory operably coupled to the rad-hard processor. The rad-hard processor can cause the second processor to execute compute-intensive tasks that can be performed more quickly or with fewer computing resources by the second processor than the rad-hard processor. The rad-hard processor can selectively cause the second processor to execute a compute-intensive task based upon determining that the second processor is in a normal operating state. The rad-hard processor can further evaluate computing results generate by the second processor to determine whether such computing results meet an applicable acceptability condition. The rad-hard processor can employ a computing result that meets an applicable acceptability condition in further computing operations.

17 Claims, 6 Drawing Sheets

HETEROGENEOUS RADIATION-HARDENED COMPUTING SYSTEM

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Embedded systems operating in certain environments, such as on spacecraft or near nuclear reactors, are often subject to high levels of radiation (e.g., electromagnetic radiation or nuclear radiation). Electronic components of these systems can be sensitive to such radiation, and can exhibit operational errors or component damage as a result. For example, radiation impinging on a processor or memory of a computing system can cause a bit value stored in the memory or employed by the processor to be flipped from a '0' to a '1' or vice versa. Radiation-hardened (rad-hard) versions of various electronic components have been developed for use in systems that operate in high-radiation environments. For example, rad-hard processors and memories have been developed for use in computing systems that are intended to operate in high-radiation environments. These components include rad-hard-by-process (RHBP) devices and rad-hard-by-design (RHBD) devices. RHBP devices employ one or more electronic components that are themselves hardened against radiation by virtue of their manufacturing. RHBD devices are generally manufactured using conventional, non-hardened semiconductor fabrication processes and thus generally employ electronic components that are not themselves hardened against radiation. Rather, RHBD devices are resistant to radiation due to hardware-level redundancies.

While RHBP and RHBD devices provide some resilience against the effects of radiation, they are subject to various shortcomings. For instance, since RHBD devices employ underlying components that are not themselves rad-hard, these devices remain subject to radiation-induced errors that are not readily corrected with redundancy (e.g., multiple simultaneous component failure). Furthermore, RHBD devices that employ redundant components may have higher power requirements and lower energy efficiency than non-redundant designs.

RHBP devices, which can additionally include redundancy features similar to those found on RHBD devices, are less susceptible to radiation at the basic component level (e.g., the transistor level) than pure RHBD devices. However, since RHBP devices often require different manufacturing processes than conventional devices, RHBP devices are generally manufactured on older semiconductor manufacturing process nodes. These older process nodes yield devices that are generally characterized by larger minimum feature sizes and lower clock speeds than devices manufactured using leading-edge commercial semiconductor manufacturing process nodes. Accordingly, a RHBP processor can require more time, compute cycles, energy, or power in order to perform a compute task than a leading-edge commercial processor.

SUMMARY

The following is a brief summary of subject matter that is described in greater detail herein. This summary is not intended to be limiting as to the scope of the claims.

Various technologies pertaining to a computing system that is hardened against various forms of radiation are described herein. In an exemplary embodiment, a rad-hard computing system comprises a rad-hard processor, a memory, and a second processor. The rad-hard computing system can be included in an operational system that is intended to operate in a high-radiation environment. For instance, the rad-hard computing system can be employed as a control system for a spacecraft, a land vehicle, a robot, physical plant of a nuclear reactor, or the like. The rad-hard computing system is configured such that the rad-hard processor performs a first subset of computing tasks that are performed by the rad-hard computing system, and the second processor performs a second subset of computing tasks that are performed by the rad-hard computing system. By way of example, and not limitation, the rad-hard processor can perform computing tasks that are critical for safe or appropriate operation of a larger operational system. For instance, the rad-hard processor can be configured to perform computing tasks related to control operations for the larger system in which the rad-hard computing system is integrated. In another example, the second processor can be configured to perform a compute-intensive task such as video processing, sensor data analysis, computationally-complex system control, or the like. Thus, the second processor, which may be able to perform computing tasks more quickly than the rad-hard processor, can perform tasks that require greater computational resources.

The rad-hard processor can perform the first subset of computing tasks based upon computing results generated by the second processor in connection with performing the second subset of computing tasks. For example, the rad-hard processor can control the operation of one or more physical systems based upon an analysis of sensor data performed by the second processor. In a more specific example, the rad-hard computing system can be included on an autonomous or semi-autonomous vehicle such as a spacecraft or a land-based probe. The second processor can identify, in a video signal comprising a plurality of image frames, the presence of an object and can output an indication of the presence of the object to the rad-hard processor. The rad-hard processor can control operation of the vehicle based upon the presence of the object. For instance, the rad-hard processor can control a motive system of the vehicle, such as a thruster, a rocket motor, an electric motor, etc., to cause the vehicle to avoid the object.

In various embodiments, the rad-hard processor receives a compute-intensive task. By way of example, and not limitation, the compute-intensive task can be an image-analysis task for identifying an object in an image or series of images, a data processing task for analyzing and detecting the presence of objects represented in sensor data (e.g., radar data or lidar data), or a cryptographic computation task. The rad-hard processor determines whether the second processor is in a normal operating state. Based upon determining that the second processor is in the normal operating state, the rad-hard processor provides the compute-intensive task to the second processor such that the second processor executes the compute-intensive task.

In further embodiments, the rad-hard processor receives a computing result generated by the second processor in connection with the second processor performing a computing task. By way of example, the computing task can be a recurring computing task such as a task to perform image processing on streaming video to identify objects in video frames. In another example, the computing task can be a computing task that the rad-hard processor provides to the second processor (e.g., the compute-intensive task referenced above). The second processor performs the computing task (e.g., by executing a compute-intensive routine) and generates a computing result.

Responsive to receiving the computing result from the second processor, the rad-hard processor determines whether the computing result meets an acceptability condition pertaining to the computing result. The acceptability condition specifies conditions under which the computing result is taken to be an acceptable computing result for the given computing task. By way of example, and not limitation, the acceptability condition can indicate values that the computing result can take without being considered erroneous. For instance, the acceptability condition can indicate a number of objects that can be identified in an image by executing an image analysis task over the image. An exemplary acceptability condition can be that the number of objects identified in the image be less than half a number of pixels of the image.

Responsive to determining that the computing result meets the acceptability condition, the rad-hard processor can perform further operations based upon the computing result. In a non-limiting example, the rad-hard processor can be configured to control a physical system based upon the computing result. Responsive to determining that the computing result does not meet the acceptability condition, the rad-hard processor can take various actions intended to correct or mitigate the effect of a potential radiation-induced error in the computing result. For example, the rad-hard processor can cause the second processor to reset, to execute a self-test routine, or to recompute the computing result by repeating the compute-intensive task.

Rad-hard computing systems described herein allow a faster second processor, which may be susceptible to radiation, to perform compute-intensive tasks that may be impractical to perform using a rad-hard processor. By employing the rad-hard processor to check that the second processor is operating in a normal operating state, and is generating computing results that meet various criteria for acceptability, errors that may be introduced into such computing results can be avoided or mitigated. For instance, the rad-hard processor can reject a computing result that is generated by the second processor and appears to be erroneous. By retaining control of critical operations of an operational system to which the rad-hard computing system is coupled, the rad-hard processor can prevent radiation-induced errors of the second processor from negatively impacting performance of the operational system.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to a rad-hard computing system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

Furthermore, it is to be understood that reference made herein to a first processor providing or outputting data or instructions to a second processor is intended to encompass the first processor writing or otherwise storing the data or instructions in one or more memory locations that are accessible to the second processor and causing the second processor to access such data or instructions.

Figure 1:
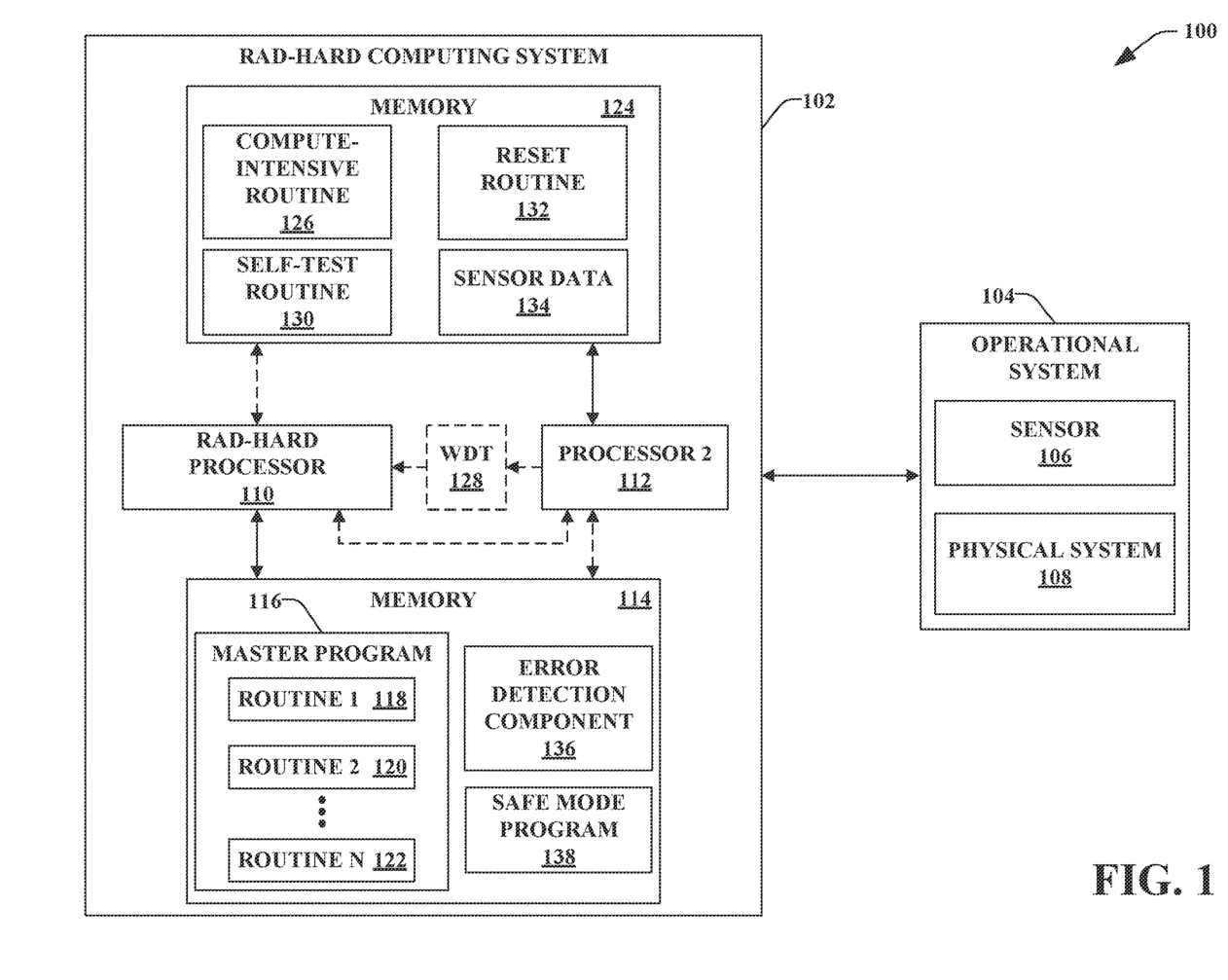
FIG. 1 is a functional block diagram of an exemplary rad-hard computing system.

With reference to FIG. 1, an exemplary computing environment 100 that includes a rad-hard computing system 102 is illustrated. The computing environment 100 includes an operational system 104 with which the rad-hard computing system 102 is configured to communicate. The operational system 104 can be a system from which the rad-hard computing system 102 is configured to receive data. By way of example, and not limitation, the operational system 104 can include a sensor 106 that outputs sensor data to the rad-hard computing system 102. In further embodiments, the operational system 104 can be a system that the rad-hard computing system 102 is configured to control. For instance, the operational system 104 can include a physical system 108 to which the rad-hard computing system 102 transmits a control signal that causes the physical system 108 to perform various functions. In exemplary embodiments, the physical system 108 can be or include an actuator, a motor or engine, a signaling device such as a light or a speaker, a communications system, etc. From the foregoing it is to be appreciated that the operational system 104 can include one or both of the sensor 106 and the physical system 108. The rad-hard computing system 102 can receive sensor data from the sensor 106 and based upon such sensor data can generate a control signal that is provided to the physical system 108 to cause the physical system 108 to perform some function. It is further to be appreciated that the operational system 104 can be, include, or be included on a common platform on which the rad-hard computing system 102 is mounted. In a non-limiting example, the operational system 104 can be a satellite or other space probe on which the rad-hard computing system 102 is mounted.

While the rad-hard computing system 102 is described herein as interacting with the operational system 104 that includes the sensor 106 and the physical system 108, it is to be understood that the rad-hard computing system 102 can receive signals or data from and output signals or data to substantially any system with which the rad-hard computing system 102 is desirably integrated. In further non-limiting examples, the rad-hard computing system 102 can receive data from and output data to another computing system that is included on a common operational system with the rad-hard computing system 102. In another example, the rad-hard computing system 102 can receive data from and output data to another device by way of a network connection.

The rad-hard computing system 102 includes a rad-hard processor 110, a second processor 112, and a memory 114. The rad-hard processor 110 can be a RHBP processor that includes one or more components that are themselves constructed to be hardened against radiation environments experienced in the desired application. By way of example, and not limitation, the rad-hard processor 110 can include one or more components (e.g., a transistor, a capacitor, a diode, etc.) that are formed on an isolating element that isolates the components from a charge-collecting substrate. In exemplary embodiments, the isolating element comprises or consists substantially of silicon dioxide, sapphire, or the like. In further examples, the rad-hard processor 110 can include one or more components that are formed on a substrate that has a wider band gap than conventional silicon substrates. In exemplary embodiments, the wide-band-gap substrate comprises or consists substantially of silicon carbide or gallium nitride. In various embodiments, the rad-hard processor 110 can include one or more components having a rad-hard isolation oxide, a rad-hard gate oxide, a rad-hard buried oxide, a rad-hard field oxide, or ion implants that improve the resistance of the one or more components to various forms of radiation. In some embodiments, the rad-hard processor 110 can be a RHBD processor, or can be both RHBP and RHBD.

By contrast, the second processor 112 is a processor that does not incorporate sufficient RHBP or RHBD modifications to operate reliably in the radiation environment in which the rad-hard computing system 102 is desirably deployed. For example, the second processor 112 can be a processor that is formed by a cutting-edge semiconductor fabrication process where RHBP modifications are unavailable. In some embodiments, the second processor 112 can be a RHBD device. For example, the second processor 112 can be designed with redundant circuits to mitigate the effects of radiation-induced errors. The second processor 112 can generally perform computing tasks faster (e.g., using fewer computing cycles or in less time) than the rad-hard processor 110. For instance, the second processor 112 can be capable of a maximum instructions-per-second (IPS) rate that is greater than a maximum IPS rate of the rad-hard processor 110. However, the second processor 112 may be more vulnerable to radiation-induced errors than the rad-hard processor 110.

The rad-hard computing system 102 is configured such that the rad-hard processor 110 performs a first subset of computing tasks that are performed by the rad-hard computing system 102, and the second processor 112 performs a second subset of computing tasks that are performed by the rad-hard computing system 102. In exemplary embodiments, the rad-hard processor 110 performs tasks that are operationally critical to the operational system 104 (e.g., control of the physical system 108), whereas the second processor 112 performs compute-intensive tasks (e.g., analysis of sensor data output by the sensor 106).

The memory 114 comprises a master program 116 that is executed by the rad-hard processor 110. The master program 116 is executed by the rad-hard processor 110 during normal operations of the rad-hard computing system 102. The master program 116 can include a plurality of N routines 118-122, where N is a non-zero integer. The rad-hard processor 110 can execute the routines 118-122 in a parallel manner. In an exemplary embodiment, the rad-hard processor 110 can include multiple processing cores. In such embodiments, the rad-hard processor 110 can execute the first routine 118 by way of a first processing core and the second routine 120 by way of a second processing core. In further embodiments, the rad-hard processor 110 can execute one of the routines 118-122 during execution of another of the routines 118-122. For example, the second routine 120 can be a subroutine of the first routine 118, and the rad-hard processor 110 can execute the second routine 120 in connection with executing the first routine 118.

In exemplary embodiments, one or more of the routines 118-122 can comprise a compute-intensive task. In an exemplary embodiment, the first routine 118 can be a master routine governing control of the operational system 104 by the rad-hard computing system 102. The second routine 120 can be, for example, a compute-intensive sensor data analysis routine that, when executed by one of the processors 110, 112, causes the processor to generate an analysis result based upon sensor data. Among instructions of the master routine can be an instruction to execute the sensor data analysis routine in order to generate the analysis result. When executing the master routine, and due to the sensor data analysis routine being a compute-intensive task, the rad-hard processor 110 can cause the second processor 112 to execute the sensor data analysis routine.

The rad-hard processor 110 can cause the second processor 112 to execute a compute-intensive task by causing the second processor 112 to execute one of the routines 118-122 stored in the memory 114. In such embodiments, the memory 114 of the rad-hard computing system 102 can be a shared memory that is accessible by both the rad-hard processor 110 and the second processor 112. The memory 114 can be a RHBP device, whereby the memory 114 is formed such that one or more of the components of the memory 114 is itself hardened against radiation. In some embodiments, the memory 114 can be a RHBD memory, or a memory that is both RHBP and RHBD.

In various embodiments, the rad-hard computing system 102 can further include a second memory 124. The second memory 124 can be a memory device that does not operate reliably in the radiation environment in which the rad-hard computing system 102 is desirably operated. The second processor 112 can be configured to execute programs or routines and/or retrieve data that are stored in the second memory 124, rather than executing programs/routines or retrieving data from the memory 114. In other words, the rad-hard computing system 102 can be configured such that the rad-hard processor 110 accesses a rad-hard memory, the memory 114, and the second processor 112 accesses a memory, the second memory 124, that may be faster than the rad-hard memory but more susceptible to radiation-induced errors in operation and data retention. In these embodiments, the rad-hard processor 110 can cause the second processor 112 to execute a compute-intensive task (e.g., a sensor data analysis routine) by causing the second processor 112 to execute a compute-intensive routine 126 that is stored in the second memory 124. It is to be understood, however, that in some embodiments, the rad-hard processor 110 can also be configured to access the second memory 124, although the second memory 124 may not be as resilient against the effects of radiation as the memory 114. In a non-limiting example, the rad-hard processor 110 can be configured to query the second memory 124 to receive or determine a state of health metric for the second memory 124, the state of health metric being a measure of appropriate performance of the second memory 124.

The rad-hard processor 110 can be variously configured to cause the second processor 112 to execute the compute-intensive task. For instance, the master program 116 can be configured with instructions that cause the rad-hard processor 110 to initiate execution of the compute-intensive task by the second processor 112. In an example, the master program 116 can be configured such that some subset of the routines 118-122 are indicated as compute-intensive routines that are to be executed by the second processor 112 rather than the rad-hard processor 110. When the master program 116 indicates that one of the compute-intensive routines in the routines 118-122 is to be executed, the rad-hard processor 110, rather than executing the compute-intensive routine itself, causes the second processor 112 to execute the compute-intensive routine. In another example, the master program 116 can be configured such that, by executing one of the routines 118-122, the rad-hard processor 110 causes the second processor 112 to execute the compute-intensive routine 126 stored in the second memory 124. For example, the master program 116 can include a call to one of the routines 118-122 that corresponds to a compute-intensive task. The called routine can be configured such that, when executed by the rad-hard processor 110, the rad-hard processor 110 causes the second processor 112 to execute the compute-intensive routine 126. In some embodiments, the rad-hard processor 110 can be configured to provide an instruction directly to the second processor 112, for example by modifying a program counter included in the second processor 112 such that the second processor 112 initiates execution of the compute-intensive routine 126.

The rad-hard processor 110 can be configured to cause the second processor 112 to execute a compute-intensive task responsive to determining that the second processor 112 is in a normal operating state. In some embodiments, responsive to determining that the second processor 112 is in the normal operating state, the rad-hard processor 110 can be configured not to require a further determination that the second processor 112 is in the normal operating state prior to causing the second processor 112 to execute a second compute-intensive task. For example, responsive to determining that the second processor 112 is in the normal operating state, the rad-hard processor 110 can continue to provide compute-intensive tasks to the second processor 112 for a pre-defined period of time or a pre-defined number of computing cycles. After the pre-defined period of time has elapsed or the pre-defined number of computing cycles has occurred, the rad-hard processor 110 can be required to perform another determination that the second processor 112 is in the normal operating state before providing further computing tasks to the second processor 112.

The rad-hard processor 110 can determine that the second processor 112 is in a normal operating state in various ways. In a non-limiting example, the rad-hard computing system 102 can include a watchdog timer (WDT) 128. The WDT 128 can be coupled to the rad-hard processor 110 and the second processor 112. In its normal operating state, the second processor 112 can be configured to reset the WDT 128 sufficiently often that the WDT 128 does not output an interrupt to the rad-hard processor 110. If the second processor 112 fails to reset the WDT 128, the WDT 128 outputs the interrupt to the rad-hard processor 110. Responsive to receiving an interrupt from the WDT 128, the rad-hard processor 110 determines that the second processor 112 is not in a normal operating state (e.g., due to the effects of radiation on the second processor 112).

In another example, the rad-hard processor 110 can determine that the second processor 112 is in a normal operating state based upon the results of a self-test routine performed by the second processor 112. The second memory 124 can include a self-test routine 130. In other embodiments wherein the rad-hard computing system 102 does not include the second memory 124, the self-test routine 130 can instead be stored in the memory 114. The rad-hard processor 110 can cause the second processor 112 to execute the self-test routine 130. The second processor 112 can otherwise or additionally be configured to execute the self-test routine 130 periodically or in a repeated, intermittent fashion. The second processor 112 can be configured to output a result of execution of the self-test routine 130 to the rad-hard processor 110. The rad-hard processor 110 can determine whether the second processor 112 is in the normal operating state based upon the result of the second processor 112 executing the self-test routine 130.

In still another example, determining that the second processor 112 is in a normal operating state can include providing the second processor 112 with a test computing task. The test computing task can be a computing task with a known correct result (e.g., a known numerical value). The rad-hard processor 110 can determine that the second processor 112 is in a normal operating state responsive to determining that a result of the test computing task that is output by the second processor 112 is the known correct result. The rad-hard processor 110 can instruct the second processor 112 to execute the test computing task. For example, the rad-hard processor 110 can instruct the second processor 112 to execute one of the routines 118-122 that defines the test computing task. Responsive to executing the test computing task, the second processor 112 outputs a result of execution of the test computing task to the rad-hard processor 110. The rad-hard processor 110 can determine that the second processor 112 is in a normal operating state responsive to determining that the result output by the second processor 112 is the known correct result.

It is to be understood that the rad-hard processor 110 can employ multiple criteria in connection with determining whether the second processor 112 is in a normal operating state. In such embodiments, the rad-hard processor 110 can determine that the second processor 112 is in the normal operating state only if the second processor 112 meets all of a plurality of criteria for determining that the second processor 112 is in the normal operational state. Stated differently, the rad-hard processor 110 can determine that the second processor 112 is not in the normal operating state if the second processor 112 fails to meet any single one of several criteria for determining that the second processor 112 is in the normal operating state. For example, the rad-hard processor 110 can determine that the second processor 112 is in a normal operating state based upon determining that the WDT 128 has not issued an interrupt and that the second processor 112 has computed the correct result of a test compute task having a known correct result. In other embodiments, the rad-hard processor 110 can determine that the second processor 112 is in the normal operating state by determining that the second processor 112 meets a majority of criteria, or by determining that the second processor 112 meets a single critical criterion (e.g., that the WDT 128 has not issued an interrupt to the rad-hard processor 110) and a threshold number of additional criteria (e.g., at least one of a self-test routine or a test compute task executed by the second processor 112 has returned a correct result).

In some embodiments, the rad-hard processor 110 can further be configured to determine whether the second memory 124 is in a normal operating state. For example, the rad-hard processor 110 can be configured to perform a test routine with respect to the second memory 124 to verify that the second memory is in the normal operating state. The test routine can include querying the second memory 124 in order to cause the second memory 124 to return a value stored in the second memory 124. If the second memory 124 returns the expected value, the rad-hard processor 110 can determine that the second memory 124 is in the normal operating state. In other examples, the test routine can be a recurring operation whereby the rad-hard processor 110 periodically, or repeatedly and intermittently, queries the second memory 124 for one or more values stored in the second memory 124. If the second memory 124 returns correct, expected values in response to the queries, the rad-hard processor 110 can determine that the second memory 124 is in the normal operating state. Other means of the rad-hard processor 110 determining that the second memory 124 is in the normal operating state are contemplated as being within the scope of the present disclosure.

The rad-hard processor 110 can cause the second processor 112 to perform a compute-intensive task responsive to determining that the second processor 112 is in a normal operating state. In some embodiments, the rad-hard processor 110 causes the second processor 112 to perform the compute-intensive task responsive to determining that both the second processor 112 and the second memory 124 are in respective normal operating states. The second memory 124 can further include a reset routine 132. In some embodiments, responsive to determining that the second processor 112 is not in the normal operating state, the rad-hard processor 110 can cause the second processor 112 to execute the reset routine 132. In some embodiments, the reset routine 132 can be stored in the memory 114, which may be hardened against radiation and less susceptible to radiation-induced error, rather than the second memory 124.

In some embodiments, the second processor 112 can be configured to execute a compute-intensive task and to generate a computing result without specific direction from the rad-hard processor 110. For instance, the second processor 112 can be configured to perform a compute-intensive task periodically, repeatedly and intermittently, or in response to pre-defined conditions. In a non-limiting example, the compute-intensive routine 126 can be a cryptographic algorithm, and the second processor 112 can be configured to periodically compute a cryptographic result (e.g., an encrypted ciphertext, or a decrypted plaintext from an input ciphertext). In another example, the second processor 112 can be configured to perform a sensor data analysis task responsive to the rad-hard computing system 102 receiving sensor data from the sensor 106, which sensor data can be stored as sensor data 134 in the second memory 124. The sensor 106 can be configured to output sensor data to the rad-hard computing system 102 in a substantially continuous stream of sensor data. In such embodiments, the second processor 112 can execute a sensor data analysis task continually or repeatedly as the rad-hard computing system 102 receives additional sensor data from the sensor 106. In still another example, the second processor 112 can be configured to continually execute a compute-intensive control algorithm. The control algorithm can be an algorithm that is configured to generate appropriate control signals to effectuate intended operation of the physical system 108 of the operational system 104. For instance, in an embodiment wherein the operational system 104 comprises an autonomous probe, the control algorithm can be configured to generate control signals for a motor and a steering system of the probe to cause the probe to navigate about its operational environment.

Responsive to executing a compute-intensive task (e.g., the compute-intensive routine 126 or a compute-intensive one of the routines 118-122), the second processor 112 generates a computing result. The second processor 112 can output the computing result to the rad-hard processor 110. The rad-hard processor 110 can then perform one or more actions based upon the computing result. For instance, the rad-hard processor 110 can be configured to control operation of the physical system 108 of the operational system 104 based upon the computing result.

The rad-hard processor 110 can further be configured to determine whether the computing result meets an acceptability condition prior to taking further action based upon the computing result. In exemplary embodiments, the memory 114 further comprises an error detection component 136. The error detection component 136 is configured to cause the rad-hard processor 110 to determine whether a computing result received from the second processor 112 meets an acceptability condition. The acceptability condition is a condition under which a computing result received from the second processor 112 is to be considered error-free or otherwise acceptable for use by the rad-hard processor 110 in connection with executing the master program 116. In some embodiments, the acceptability condition can be defined by the master program 116 being executed by the rad-hard processor 110. In other embodiments, the acceptability condition can be a condition stored in the memory 114 independently of the master program 116. In a non-limiting example, the acceptability condition can be an acceptable time condition that specifies a time or time range within which the second processor 112 should provide a computing result in response to receiving a compute-intensive task. The time/time range specified by the acceptable time condition can be a fixed time or time range that is common across several types of compute-intensive tasks. In some embodiments, the time/time range specified by the acceptable time condition can be different for each of several different types of compute-intensive tasks. In further non-limiting examples, the acceptability condition can specify a range of values within which the computing result will be determined to be acceptable. By way of further illustration, the compute-intensive routine 126 can be an image analysis routine that is configured to identify objects and their locations as represented in the sensor data 134. The acceptability condition can specify a range of acceptable values of a number of the objects identified by the second processor 112 in connection with executing the image analysis routine over the sensor data 134. For instance, the acceptability condition can specify that a number of objects identified in an image should not exceed a predefined value, or a value dependent upon a characteristic of the image such as a number of pixels of the image. By way of further illustration, the compute-intensive routine 126 can be an actuator control routine. The acceptability condition can specify a range of acceptable output actuator parameters. For instance, the acceptability condition can specify that output parameters should not exceed bounds set by the physical limits of the actuator.

In further non-limiting examples, the acceptability condition can be tailored to the second processor's behavior in the desired radiation environments. In various embodiments, the acceptability condition can be specified or selected based upon a sensitivity to errors of an operation that relies on a computing result. For example, the rad-hard processor 110 can cause the second processor 112 to perform an image processing task to generate an image. In connection with performing the image processing task, the second processor 112 can compute a plurality of pixel values. In this example, the acceptability condition can be relatively lenient with respect to the pixel values computed by the second processor 112, as each individual pixel value may not be essential to usability of a final image. In another illustrative example, the rad-hard processor 110 can cause the second processor 112 to perform a noise-sensitive cryptographic operation. The rad-hard processor 110 can apply a more stringent acceptability condition to the cryptographic operation than to the pixel values computed by the second processor 112 in the image processing example above due to the sensitivity of the cryptographic operation.

In still further embodiments, the acceptability condition can be a condition dynamically determined by the rad-hard processor 110 based upon conditions under which the rad-hard computing system 102 is operating. For instance, and as noted above, the acceptability condition can specify a time within which the second processor 112 should provide a computing result in response to receiving a compute-intensive task. In a non-limiting example, the time within which the second processor 112 should provide the computing result can be determined dynamically by the rad-hard processor 110 based upon how quickly the second processor 112 has generated computing results by executing compute-intensive tasks in a past window of time. In another example, the time within which the second processor 112 should provide the computing result can be determined based upon a quantity of data over which the second processor 112 is executing a compute-intensive task.

To illustrate further, the rad-hard processor 110 can cause the second processor 112 to execute a first sensor data analysis task over a first set of sensor data at a first time and a second sensor data analysis task over a second set of sensor data at a second time. The second set of sensor data can be larger than the first set of sensor data. The rad-hard processor 110 can determine a first acceptable time condition to be applied to a computing result of the first sensor data analysis task based upon the size of the first set of sensor data. The rad-hard processor 110 can determine a second acceptable time condition to be applied to a computing result of the second sensor data analysis task based upon the size of the second set of sensor data. The first acceptable time can be shorter than the second acceptable time due to the second set of sensor data being larger than the first set of sensor data.

In a further example, the acceptability condition can be dynamically determined by the rad-hard processor 110 by computing an approximate expected result of a compute-intensive task executed by the second processor 112. In some embodiments, one of the routines 118-122 is an approximation routine that is configured to approximate the compute-intensive routine 126. The approximation routine is an algorithm that is less compute-intensive than the compute-intensive routine 126 and that is configured to generate an approximation of a result of the compute-intensive routine 126. The rad-hard processor 110 can execute the approximation routine to generate an approximate computing result. The rad-hard processor 110 can then define an acceptability condition based upon the approximate computing result. For example, if the approximate computing result is a numerical value, the rad-hard processor 110 can define the acceptability condition to be that the computing result of the compute-intensive routine 126 must be within a threshold percent of the approximate computing result (e.g., +2.5%, +5%, or ±10% relative to the approximate computing result).

In another example, the compute-intensive routine 126 can be a routine for identifying a region within sensor data (e.g., a group of pixels in an image or a group of points in a lidar point cloud) that are representative of a same object. In such embodiments, an approximation routine of the compute-intensive routine 126 can be a routine for identifying such a region that may be less robust than the compute-intensive routine 126. The region identified by such an approximation routine, referred to here as an approximation region, can be an approximation of a region expected to be identified by the compute-intensive routine 126. In these embodiments, the acceptability condition can be based upon geometric features of the approximation region identified by the approximation routine. For example, the acceptability condition can be a condition that a centroid of the region computed by the compute-intensive routine 126 be within a threshold distance of a centroid of the approximation region. In another example, the acceptability condition can be a condition that a total size (e.g., a number of pixels in an image or a number of points in a lidar point cloud) of the region computed by the compute-intensive routine 126 be within a threshold value of the size of the approximation region. Generally speaking, in these embodiments the rad-hard processor 110 determines whether the computing result satisfies an acceptability condition based upon a measure of similarity between the approximate computing result and the computing result computed by the second processor 112.

In some embodiments, the rad-hard processor 110 employs a Kalman filter to identify an approximate range for the compute result of the compute-intensive routine. The rad-hard processor 110 can maintain a Kalman filter that is successively updated based upon additional computing results generated by the second processor 112 in connection with a plurality of executions of the compute-intensive task 126. The rad-hard processor 110 can define an acceptability condition for a successive computing result generated by execution of the compute-intensive task 126 based upon a state of the Kalman filter. In an example, the rad-hard processor 110 can determine whether a computing result generated by the second processor 112 meets an acceptability condition based upon a comparison of the computing result to an output of the Kalman filter in its current state.

In some embodiments, the acceptability condition can be a condition that the computing result output by the second processor 112 pass a verification test. By way of example, for some cryptographic tasks, generating a cryptographic result (e.g., an encrypted ciphertext of a plaintext string or decrypted plaintext string of an encrypted ciphertext) can be computationally intensive, whereas verifying the cryptographic result can be relatively computationally inexpensive. In such example, the second processor 112 can generate the cryptographic result by executing the compute-intensive routine 126. The rad-hard processor 110 receives the cryptographic result from the second processor 112 and verifies the cryptographic result by executing a verification routine (e.g., from among the routines 118-122) that is computationally less expensive than the compute-intensive routine 126. If the cryptographic result is verified by the verification routine, the rad-hard processor 110 determines that the cryptographic result has met the acceptability condition. If the cryptographic result is not verified by the verification routine, the rad-hard processor 110 determines that the cryptographic result has not met the acceptability condition.

Responsive to receiving a computing result that meets an applicable acceptability condition from the second processor 112, the rad-hard processor 110 can perform an additional computing task based upon the computing result. For example, the rad-hard processor 110 can cause a control signal to be transmitted to the physical system 108 based upon the computing result. In an exemplary embodiment wherein the operational system 104 is an autonomous vehicle, the physical system 108 can be a braking system, and the rad-hard processor 110 can cause the braking system to initiate braking in response to the second processor 112 identifying, in an image, an object in the path of the vehicle. In another example, the computing result can be a cryptographic result generated by the second processor 112. In such an embodiment, the rad-hard processor 110 can cause the cryptographic result to be output to another computing system (not shown) responsive to determining that the cryptographic result meets an applicable acceptability condition.

Responsive to determining that the computing result does not meet an applicable acceptability condition, the rad-hard processor 110 can take various corrective or mitigating actions. In an example, the rad-hard processor 110 can cause the second processor 112 to repeat execution of the compute-intensive routine 126 responsive to determining that the computing result does not meet the acceptability condition. In other words, the rad-hard processor 110 can cause the second processor 112 to re-compute the computing result. For some low-to-medium radiation environments, re-computing a computing result may be sufficient to mitigate the effects of a transitory radiation-induced computing error.

In another example, responsive to determining that the computing result does not meet an applicable acceptability condition, the rad-hard processor 110 can fail to employ the computing result in the performance of a further computing task. For instance, the rad-hard processor 110 can control the physical system 108 based upon objects identified by the second processor 112 by executing a compute-intensive image analysis routine over a set of image frames. The rad-hard processor 110 can determine that a computing result (e.g., a set of identified objects) for one of the image frames does not meet an applicable acceptability condition. The rad-hard processor 110 can control the physical system 108 based upon objects identified by the second processor 112 in a subset of the image frames that excludes the image frame for which the computing result did not meet the acceptability condition.

The rad-hard computing system 102 is configured to operate in high-radiation environments that would otherwise render a conventional computing system (i.e., not radiation-hardened) unreliable due to radiation-induced errors, while still employing the high performance second processor 112 for the performance of compute-intensive tasks. However, in some environments, a radiation-induced error rate in computing results generated by the second processor 112 may be sufficiently high that operation of the rad-hard computing system 102 (e.g., according to the master program 116) is impaired by a low number of computing results meeting an acceptability condition. Furthermore, in such high-radiation environments, it may be that the second processor 112 ceases to operate in its normal operating state (e.g., as described in greater detail above). The memory 114, which may be rad-hard, can include a safe mode program 138. The rad-hard processor 110 can be configured to execute the safe mode program 138 in response to various conditions that may make operation of the master program 116 undesirable. In a non-limiting example, the rad-hard processor 110 can execute the safe mode program 138 in response to determining that an error rate of computing results generated by the second processor 112 (e.g., a fraction of the computing results that fail to meet an applicable acceptability condition) has exceeded a threshold level within a window of time. For instance, responsive to determining that an error rate of the computing results exceeds the threshold value in a window of 10 seconds, 30 seconds, or 60 seconds prior to a current time, the rad-hard processor 110 can initiate execution of the safe mode program 138. In another embodiment, the rad-hard processor 110 can initiate execution of the safe mode program 138 responsive to determining that the second processor 112 is not in its normal operating state. In some embodiments, the rad-hard processor 110 can be configured to execute the safe mode program 138 as a default or fail safe program for the rad-hard computing system 102 even in environments in which radiation levels are low enough that the second processor 112 is capable of acceptable error rates.

The safe mode program 138 is configured to facilitate a safe state of operation of the rad-hard computing system 102 and/or the operational system 104 without relying on operation of the second processor 112. In some embodiments, the safe mode program 138 includes similar functionality to the master program 116, without reliance on compute-intensive routines. For example, in embodiments wherein the master program 116 includes a compute-intensive routine for image analysis, the safe mode program 138 can instead employ an image analysis routine that is less compute-intensive, and that can be performed by the rad-hard processor 110 while maintaining other desired operating characteristics of the rad-hard computing system 102 (e.g., a desired compute time for the image analysis routine, or a desired level of power draw of the rad-hard computing system 102).

In other embodiments, the safe mode program 138 can be configured to cause the rad-hard computing system 102 to put the operational system 104 into a safe physical operating state. For example, the operational system 104 can be an autonomous vehicle such as an unmanned aerial vehicle (UAV) or a self-driving car. The safe mode program 138 can be configured to control the physical system 108 to, for example, land or crash the UAV in an unpopulated area, or bring the self-driving car to a parked state in a location that does not obstruct the flow of traffic.

As noted above, in some embodiments, the safe-mode program 138 can be a default program that the rad-hard processor 110 executes even in environments where background radiation is sufficiently low that the second processor 112 is capable of operating in its normal operating state. In these embodiments, the rad-hard processor 110 can additionally execute various of the routines 118-122 that implicate operation of the second processor 112. Thus, when the rad-hard computing system 102 is in an environment in which radiation levels are low, the rad-hard computing system 102 employs computing results generated by the second processor 112. When the rad-hard computing system 102 is then subjected to a high-radiation environment, the rad-hard processor 110 continues executing the default safe mode program 138, while potentially rejecting computing results from the second processor 112 based upon various acceptability conditions. Hence, the rad-hard computing system 102 can continue operating in its same default state (e.g., by executing the safe mode program 138), while ceasing to employ potentially erroneous computing results from the second processor 112, without making a specific determination that execution of a distinct safe mode program is necessary.

In various embodiments described herein, the compute-intensive routine 126 and/or the routines 118-122 variably executed by the processors 110, 112 can themselves be configured to implement error detection and error correction. For example, the compute-intensive routine 126 can be an image analysis routine for object detection. The image analysis routine can include error detection and correction functionality that determines whether an object detection result is consistent with expected output of the image analysis routine (e.g., indicates a number of objects consistent with an expected number of objects to be detected).

Figure 2:
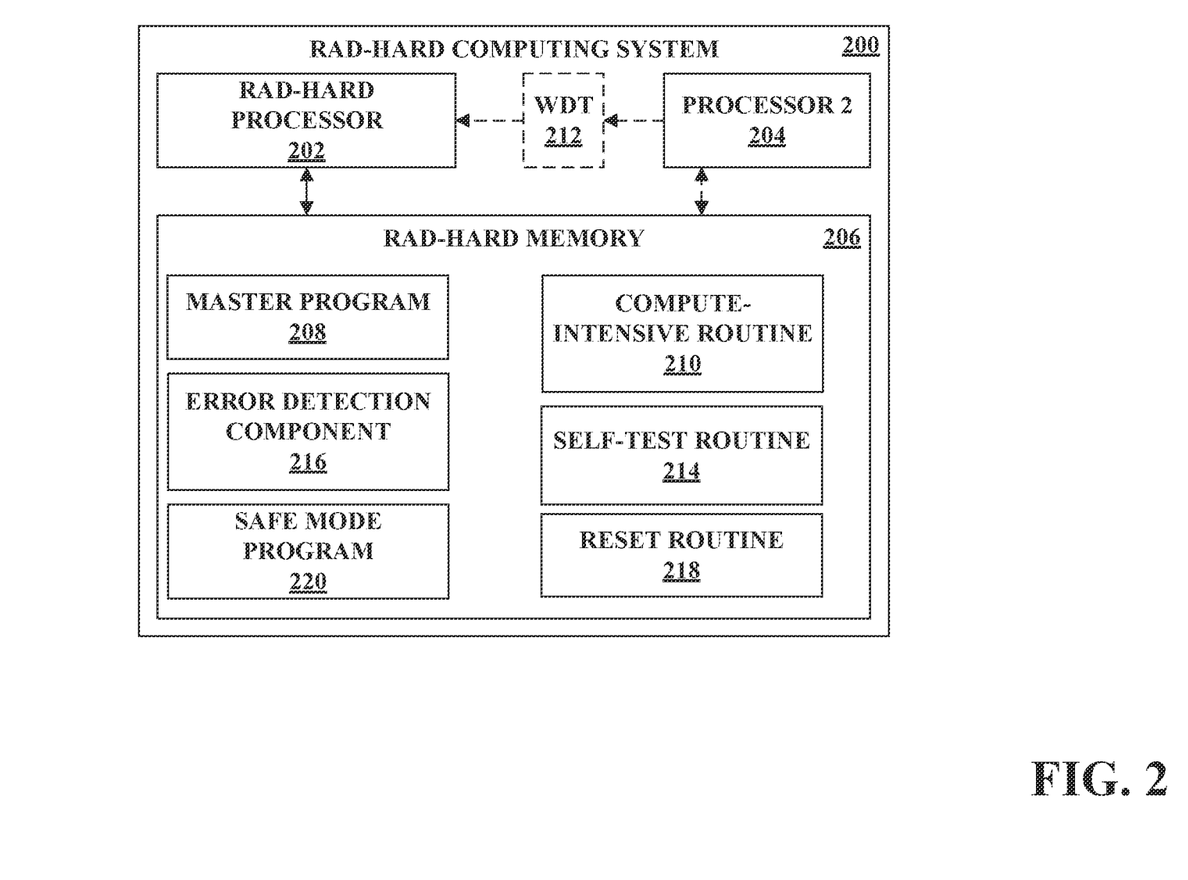
FIG. 2 is a functional block diagram of another exemplary rad-hard computing system.

It is to be understood that other configurations of the rad-hard computing system 102 are considered to be within the scope of the present disclosure. Referring now to FIG. 2, another exemplary rad-hard computing system 200 is illustrated. The rad-hard computing system 200 includes a rad-hard processor 202, a second processor 204, and a rad-hard memory 206. Each of the rad-hard processor 202 and the second processor 204 is operatively coupled to the rad-hard memory 206 such that each of the processors 202, 204 retrieves data and/or instructions from the rad-hard memory 206. The rad-hard memory 206 includes a master program 208 that is executed by the rad-hard processor 202. The rad-hard memory 206 further includes a compute-intensive routine 210 that is called by the master program 208. The rad-hard computing system 200 is configured such that the second processor 204 executes the compute-intensive routine 210 responsive to the compute-intensive routine 210 being called by the master program 208. The rad-hard processor 202 can be configured to confirm that the second processor 204 is in a normal operating state prior to the second processor 204 executing the compute-intensive routine 210. For example, the rad-hard computing system 200 can include a watchdog timer 212, which can issue an interrupt to indicate that the second processor 204 is not in a normal operating state. In another embodiment, the rad-hard memory 206 can include a self-test routine 214 that can be executed by the second processor 204 to allow the second processor 204 to indicate to the rad-hard processor 202 whether or not the second processor 204 is in its normal operating state.

The rad-hard memory 206 can further include an error detection component 216, configured similarly to the error detection component 136. The rad-hard memory 206 can further include a reset routine 218 that can be executed by the second processor 204 responsive to the rad-hard processor 202 determining that a computing result output by the second processor 204 does not meet an acceptability condition, or determining that the second processor 204 is not in a normal operating state. The rad-hard memory 206 can further include a safe mode program 220 that can be executed by the rad-hard processor 202 responsive to determining that one or more conditions are met that make execution of the master program 208 undesirable.

Figure 3:
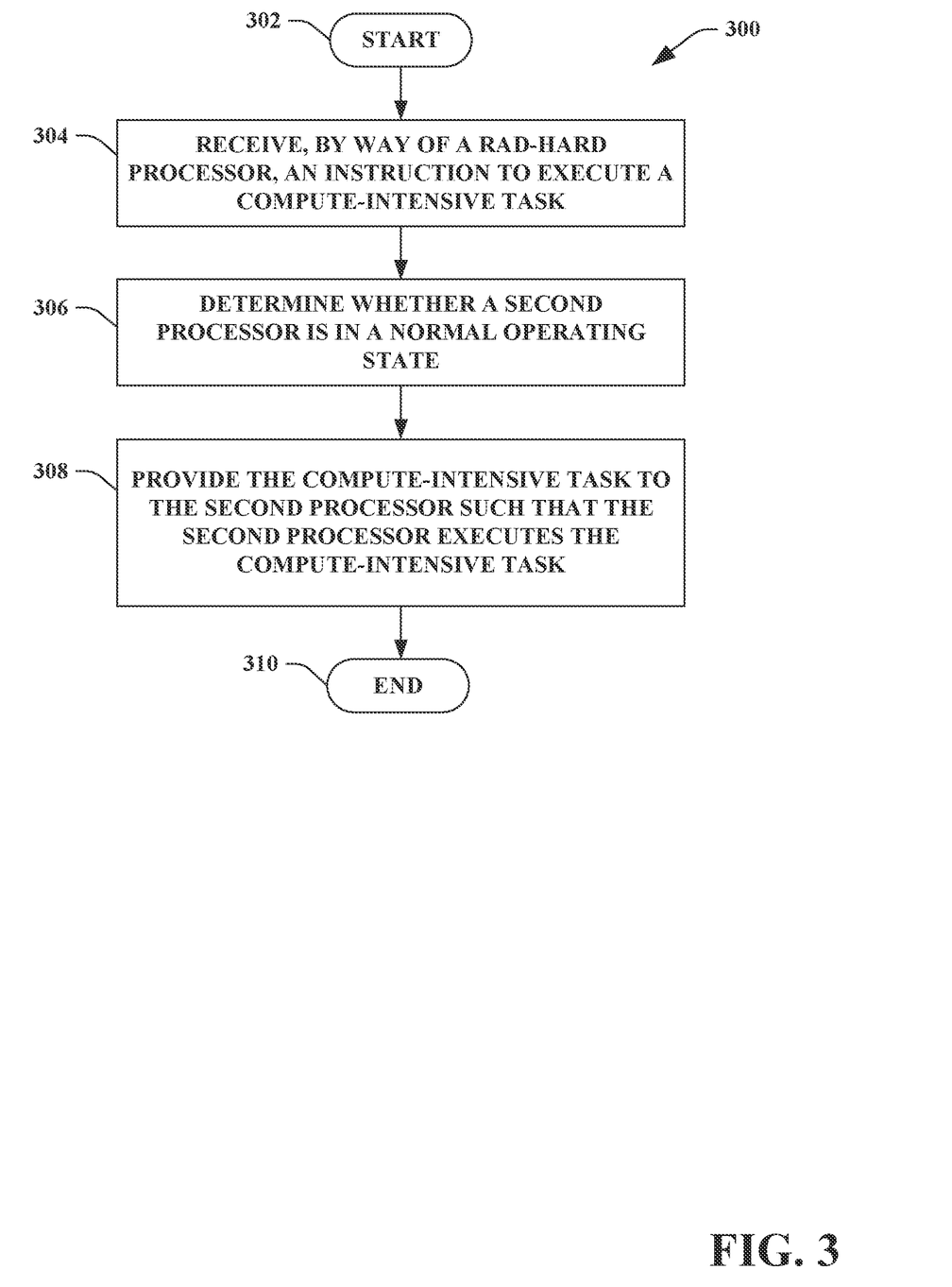
FIG. 3 is a flow diagram that illustrates an exemplary methodology relating to providing compute-intensive tasks to a processor in a rad-hard computing system.
Figure 4:
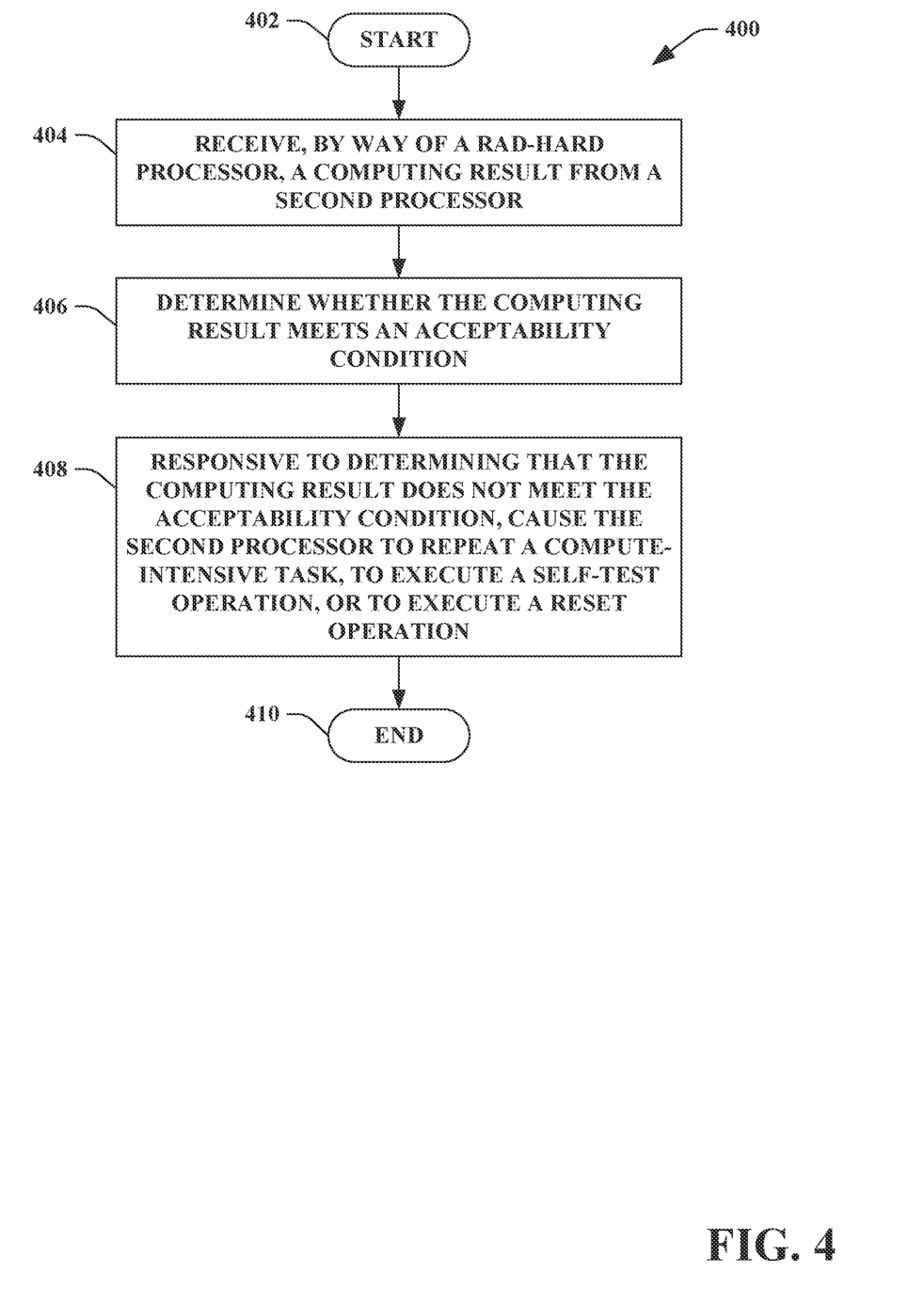
FIG. 4 is a flow diagram that illustrates an exemplary methodology relating to determining whether computing results generated by a processor in a rad-hard computing system meet an acceptability condition.
Figure 5:
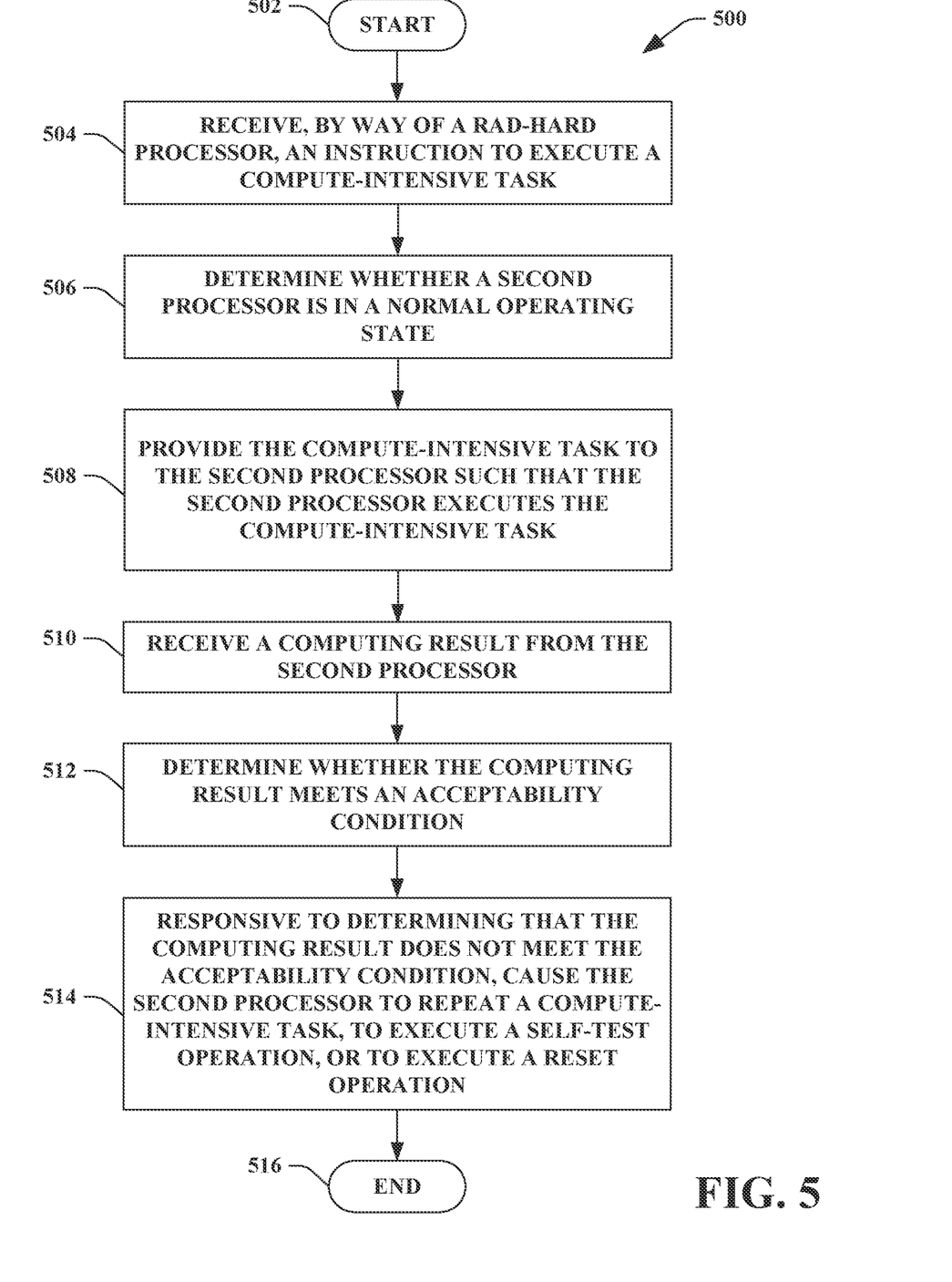
FIG. 5 is a flow diagram that illustrates an exemplary methodology for operating a rad-hard computing system.

FIGS. 3-5 illustrate exemplary methodologies relating to operations of a rad-hard computing system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 3, a methodology 300 that facilitates selectively providing compute-intensive tasks to a processor in a rad-hard computing system is illustrated. The methodology 300 begins at 302, and at 304, an instruction to execute a compute-intensive computing task is received by way of a rad-hard processor of a rad-hard computing system. At 306, the rad-hard processor determines whether a second processor of the rad-hard computing system is in a normal operating state. The rad-hard processor can determine whether the second processor is in the normal operating state, among other ways, according to any of the examples provided above with respect to FIGS. 1 and 2. At 308, based upon determining the second processor is in the normal operating state, the rad-hard processor provides the compute-intensive task to the second processor, such that the second processor executes the compute-intensive task. The methodology 300 ends at 310.

Referring now to FIG. 4, a methodology 400 relating to determining whether computing results generated by a processor in a rad-hard computing system meet an acceptability condition is illustrated. The methodology 400 begins at 402, and at 404, a computing result is received by a rad-hard processor from a second processor. At 406, the rad-hard processor determines whether the computing result meets an acceptability condition. The acceptability condition can be, inter alia, any of the acceptability conditions described above with respect to FIGS. 1 and 2. At 408, responsive to determining that the computing result does not meet the acceptability condition, the rad-hard processor causes the second processor to repeat execution of a compute-intensive task that generated the computing result, to execute a self-test operation, or to execute a reset operation. The methodology 400 ends at 410.

Referring now to FIG. 5, an exemplary methodology 500 for selectively providing compute-intensive tasks to a processor of a rad-hard computing system and evaluating computing results generated by the processor is illustrated. The methodology 500 begins at 502, and at 504, an instruction to execute a compute-intensive task is received by way of a rad-hard processor. At 506, the rad-hard processor determines whether a second processor is in a normal operating state. At 508, the rad-hard processor, based upon determining that the second processor is in the normal operating state, causes the second processor to execute the compute-intensive task (e.g., by providing the compute-intensive task to the second processor). At 510, the rad-hard processor receives a computing result from the second processor, wherein the computing result is generated by the second processor by executing the compute-intensive task. At 512, the rad-hard processor determines whether the computing result meets an acceptability condition. At 514, in response to determining that the computing result does not meet the acceptability condition, the rad-hard processor causes the second processor to do at least one of: repeating execution of the compute-intensive task, executing a self-test operation, or executing a reset operation. At 516, the methodology 500 ends.

Figure 6:
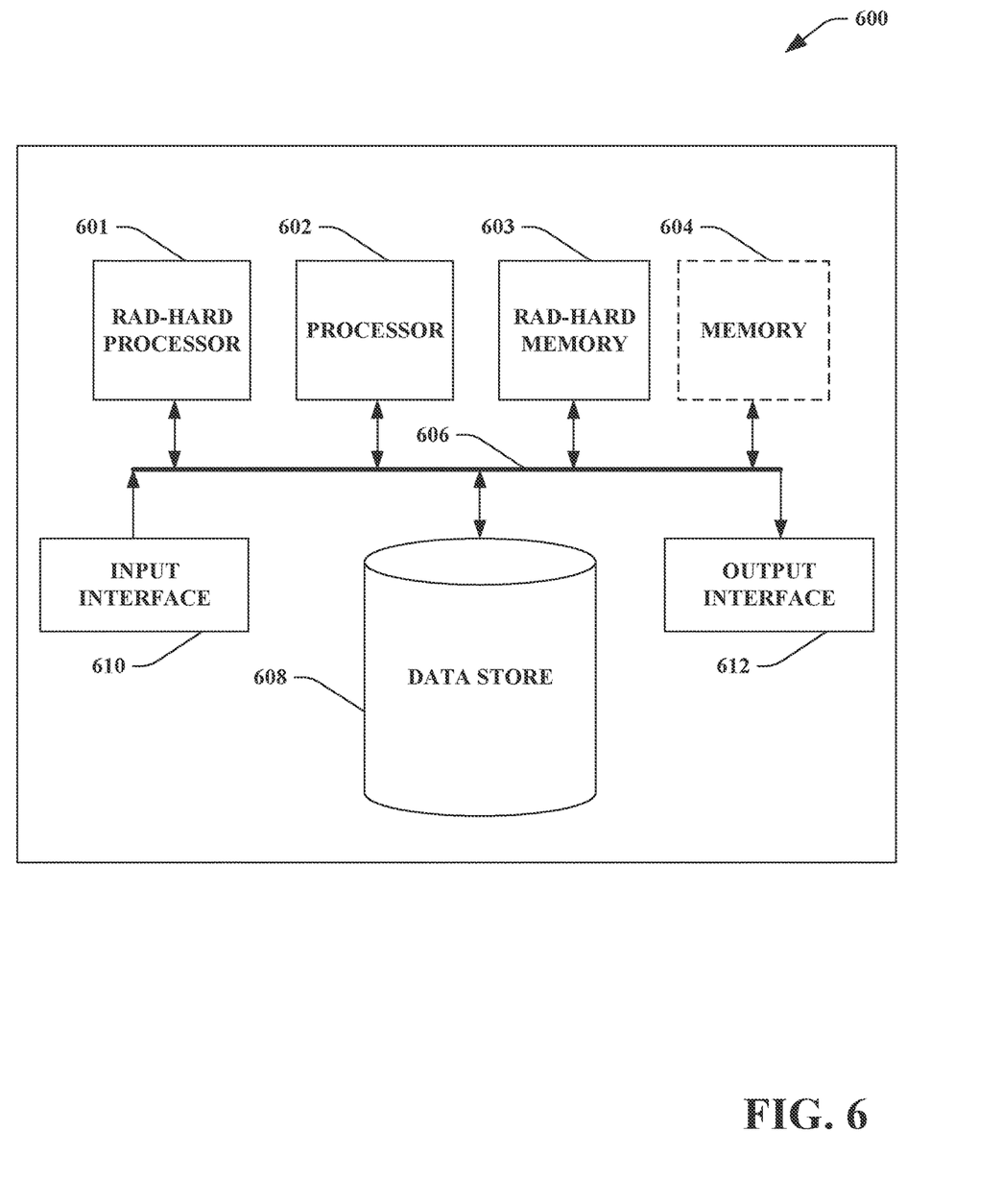
FIG. 6 is an exemplary computing system.

Referring now to FIG. 6, a high-level illustration of an exemplary computing device 600 that can be used in accordance with the systems and methodologies disclosed herein is illustrated. The computing device 600 can be representative of interconnections and functionality of the rad-hard processor 110 or the second processor 112 vis a vis other components of a computing system. The computing device 600 includes a rad-hard processor 601 (e.g., comparable to the rad-hard processors 110 or 202), and a second processor 602 (e.g., comparable to the second processor 112 or the second processor 204). As will be appreciated, the rad-hard processor 601 and/or the second processor 602 may include multiple cores or processors as is common in many processors. Further, the multiple cores or processors may have corresponding local registers and caches and/or shared registers and caches. The computing device 600 can further include a rad-hard memory 603 (e.g., comparable to the memories 114, 206) and can optionally include a second memory 604 (e.g., comparable to the memory 124) that each store respective instructions. The instructions may be, for instance, instructions for implementing functionality described as being carried out by one or more components discussed above or instructions for implementing one or more of the methods described above. The processors 601, 602 may access either or both of the memories 603, 604 by way of a system bus 606. In addition to storing executable instructions, the memories 603, 604 may also store sensor data, pre-defined acceptability conditions, etc.

The computing device 600 additionally includes a data store 608 that is accessible by the processors 601, 602 by way of the system bus 606. The data store 608 may include executable instructions, sensor data (e.g., the sensor data 134), pre-defined acceptability conditions, etc. The computing device 600 also includes an input interface 610 that allows external devices to communicate with the computing device 600. For instance, the input interface 610 may be used to receive instructions from an external computer device or from a user. The input interface 610 may also be used to receive data from a sensor, etc. The computing device 600 also includes an output interface 612 that interfaces the computing device 600 with one or more external devices such as a physical system, etc. In other embodiments, the computing device 600 may display text, images, etc., by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600. Further, it is to be understood that the rad-hard processors 110, 202, additional processors 112, 204, and memories 114, 124, 206 can be coupled to similar components in a similar manner as the rad-hard processor 601, the additional processor 602, the rad-hard memory 603, and the optional second memory 604 depicted in FIG. 6. For example, the rad-hard processor 110 can communicate with the memory 114 of the rad-hard computing system 102 by way of a system bus in a similar manner to that depicted with respect to the rad-hard processor 601 and the rad-hard memory 603 in FIG. 6. In another example, while not illustrated in FIG. 1, the rad-hard computing system 102 can include an input interface 610 that is configured to receive sensor data from the operational system 104, and an output interface 612 that is configured to output signals to the physical system 108 of the operational system 104. Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A radiation-hardened (rad-hard) computing system, comprising:
    a rad-hard processor;
    a second processor operably coupled to the rad-hard processor;
    a memory comprising instructions that, when executed by the rad-hard processor, cause the rad-hard processor to perform acts comprising:
        receiving an instruction to execute a compute-intensive task;
        determining whether the second processor is in a normal operating state; and
        based upon determining that the second processor is in the normal operating state, providing the compute-intensive task to the second processor such that the second processor executes the compute-intensive task; and
    a second memory, the second memory comprising second instructions, wherein the rad-hard processor providing the compute-intensive task to the second processor comprises causing the second processor to execute the second instructions, wherein the second processor executing the second instructions causes the second processor to execute the compute-intensive task.

2. The rad-hard computing system of claim 1, wherein the rad-hard processor is a radiation-hardened-by-process (RHBP) device.

3. The rad-hard computing system of claim 1, wherein a component of the rad-hard processor is formed such that:
    the component comprises a rad-hard isolation oxide;
    the component comprises a rad-hard gate oxide;
    the component comprises a rad-hard buried oxide;
    the component comprises a rad-hard field oxide;
    the component comprises an ion implant that improves the resistance of the component to one or more forms of radiation; or
    the component is formed on an isolation element that isolates the component from a charge-collecting substrate.

4. The rad-hard computing system of claim 1, wherein the rad-hard processor has a maximum instructions per second (IPS) that is less than a maximum IPS of the second processor.

5. The rad-hard computing system of claim 1, wherein the compute-intensive task is an image analysis task, wherein the second processor outputs, to the rad-hard processor, an indication of an object in an image based upon executing the image analysis task.

6. The rad-hard computing system of claim 5, the acts further comprising:
    responsive to receiving the indication of the object in the image, controlling operation of a physical system based upon the object being present in the image.

7. The rad-hard computing system of claim 1, the acts further comprising:
    receiving, from the second processor, a computing result generated by the second processor based upon execution of the compute-intensive task;
    determining whether the computing result meets an acceptability condition pertaining to the computing result; and
    responsive to determining that the computing result does not meet the acceptability condition, causing the second processor to perform at least one of a second execution of the compute-intensive task, a test operation, or a reset operation.

8. The rad-hard computing system of claim 1, wherein determining whether the second processor is in the normal operating state comprises:
    providing a test computing task to the second processor; and
    determining whether a computing result generated by the second processor based upon execution of the test computing task meets an acceptability condition for the computing result.

9. The rad-hard computing system of claim 1, wherein determining whether the second processor is in the normal operating state comprises:
    causing the second processor to execute a self-test routine; and
    determining, based upon results of the self-test routine, whether the second processor is in the normal operating state.

10. The rad-hard computing system of claim 1, wherein the acts further comprise:
    responsive to determining that the second processor is not in the normal operating state, causing the rad-hard processor to execute a safe-mode program.

11. A radiation-hardened (rad-hard) computing system, comprising:
    a rad-hard processor;
    a second processor operably coupled to the rad-hard processor; and
    a memory comprising instructions that, when executed by the rad-hard processor, cause the rad-hard processor to perform acts comprising:
        receiving, from the second processor, a computing result generated by the second processor based upon a first execution of a compute-intensive task by the second processor;

computing an approximate expected value of the computing result based upon execution of an approximation routine corresponding to the compute-intensive task;

determining whether the computing result meets an acceptability condition pertaining to the computing result, the acceptability condition based upon a measure of similarity between the computing result and the approximate expected value of the computing result; and responsive to determining that the computing result does not meet the acceptability condition, causing the second processor to perform at least one of:

a self-test operation;

a second execution of the compute-intensive task; or a reset operation.

12. The rad-hard computing system of claim 11, the acts further comprising:

receiving an instruction to execute the compute-intensive task;

determining whether the second processor is in a normal operating state; and based upon determining that the second processor is in the normal operating state, providing the computing task to the second processor such that the second processor executes the computing task.

13. A radiation-hardened (rad-hard) computing system, comprising:

a rad-hard processor;

a second processor operably coupled to the rad-hard processor; and a memory comprising instructions that, when executed by the rad-hard processor, cause the rad-hard processor to perform acts comprising:

receiving, from the second processor, a computing result generated by the second processor based upon a first execution of a compute-intensive task by the second processor;

determining whether a time between the second processor being provided with the compute-intensive task and the second processor providing the computing result to the rad-hard processor exceeds a threshold time or falls within an expected range of times; and responsive to determining that the time between the second processor being provided with the compute-intensive task and the second processor providing the computing result to the rad-hard processor does not exceed the threshold time or falls outside the expected range of times, causing the second processor to perform at least one of:

a self-test operation;

a second execution of the compute-intensive task; or a reset operation.

14. The rad-hard computing system of claim 13, wherein the threshold time is based upon a quantity of data over which the second processor executes the compute-intensive task to generate the computing result.

15. The rad-hard computing system of claim 11, wherein determining whether the computing result meets the acceptability condition comprises determining whether the computing result falls within a range of expected values.

16. The rad-hard computing system of claim 11, wherein the acceptability condition is dynamically determined by the rad-hard processor.

17. The rad-hard computing system of claim 11, the acts further comprising:

responsive to determining that an error rate of computing results generated by the second processor exceeds a threshold error rate, executing a safe-mode program.

* * * * *